United States Patent [19]

Yasukawa et al.

[11] Patent Number: 4,482,235
[45] Date of Patent: Nov. 13, 1984

[54] AUTOMATIC FOCUSING DEVICE FOR CAMERA

[75] Inventors: Seiichi Yasukawa, Kawasaki; Nobuhiko Terui, Tokyo; Toru Fukuhara, Isehara, all of Japan

[73] Assignee: Nippon Kogaku K.K., Tokyo, Japan

[21] Appl. No.: 441,787

[22] Filed: Nov. 15, 1982

[30] Foreign Application Priority Data

Nov. 20, 1981 [JP] Japan .................. 56-186458

[51] Int. Cl.³ .................................................. G03B 7/08
[52] U.S. Cl. .................................................. 354/402
[58] Field of Search ................ 354/25 R, 25 A, 25 P, 354/25 N, 195, 197, 286, 402-409; 350/255

[56] References Cited

U.S. PATENT DOCUMENTS

| 4,314,748 | 2/1982 | Kawabata et al. | 354/25 |
| 4,344,679 | 8/1982 | Yagi et al. | 354/25 |
| 4,370,038 | 1/1983 | Kimura | 354/25 |
| 4,400,075 | 8/1983 | Tomori et al. | 354/195 |
| 4,404,595 | 9/1983 | Ushiro et al. | 354/402 X |

Primary Examiner—William B. Perkey
Attorney, Agent, or Firm—Fitzpatrick, Cella, Harper & Scinto

[57] ABSTRACT

An automatic focusing device for camera is so formed as to attain high precision and rapid automatic focusing even for those photographing lenses whose focal length is variable as in the case of zoom lens.

8 Claims, 8 Drawing Figures

AUTOMATIC FOCUSING DEVICE FOR CAMERA

BACKGROUND OF THE INVENTION

1. Field of the Invention

The present invention relates to an automatic focusing device for a camera and more particularly to such an automatic focusing device in which the detection of focus is carried out by measuring the light transmitted through the photographing lens of the camera. The present invention relates also to a photographing lens for use in automatic focusing cameras.

2. Description of the Prior Art

As an automatic focusing device for single-lens reflex camera there is well known such a focus detection device in which the existing deviation of the real image plane of the object from a determined focal plane of the taking lens such as the film plane is detected by measuring the light transmitted through the taking lens. Typical examples of such focus detection device are disclosed, for example, in U.S. Pat. Nos. 4,185,191 and 4,264,810. With this type of focus detection device, the taking lens of the camera can be brought into the in-focus position by driving the focusing lens of the taking lens system through a distance corresponding to the detected image plane deviation.

Where the taking lens has a definite constant focal length, the relationship between the detected deviation and the distance over which the focusing lens must be shifted remains substantially constant. Therefore, in this case, the necessary high precision control for focusing can be performed in a relatively simple manner by shifting the focusing lens correspondingly to the detected deviation of the image plane.

However, where the taking lens is variable in focal length as in the case of zoom lens, the above relationship between detected deviation of image plane and the amount of shift of the focusing lens is no longer constant but variable. Therefore, in this case, it is very difficult to attain high precision and rapid automatic control of focusing. In addition, for such automatic focus control used in a single-lens reflex camera, it is absolutely necessary to transmit various signals in a reliable manner between the exchangeable taking lens structure unit and the camera body. In these years, the number of signals to be transmitted to the camera body from the exchangeable lens structure unit has increased more and more. For example, various information of the taking lens such as preset or controlled aperture value, object distance and maximum aperture value are desired to be transmitted to the camera body as electrical signals.

Naturally this means that many terminals must be provided to transmi these various electric signals to the camera body from the exchangeable lens unit. However, the space in the lens unit available for such terminals is very limited. It is very difficult in practice to reserve a sufficient space to provide such a large number of terminals. Further, the increase in number of such signal transmission terminals may cause many serious troubles such as wrong electrical contact.

SUMMARY OF THE INVENTION

Accorcingly it is an object of the invention to provide an automatic focusing device for a camera with which high precision and rapid automatic focusing can be achieved and independently of the change in focal length of the variable focal length photographing lens such as a zoom lens.

It is another object of the invention to provide a variable focal length photographing lens for automatic focusing which can generate an image plane shift signal and a correction signal useful for correcting said shift signal correspondingly to the set focal length.

It is a further object of the invention to provide an exchangeable lens structure for automatic focusing which can generate from one and the same terminal different signals including an electric signal related to the shift of the focusing lens used for automatic focusing operation and other information signals related to the exchangeable lens thereby decreasing the number of terminals required for signal transmission.

Other and further objects, features and advantages of the invention will appear more fully from the following description taken in connection with the accompanying drawings.

DESCRIPTION OF PREFERRED EMBODIMENTS

Figure 1:
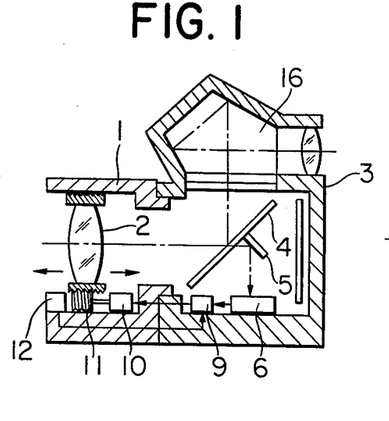
FIG. 1 is a sectional view of an automatic focusing camera.
Figure 2:
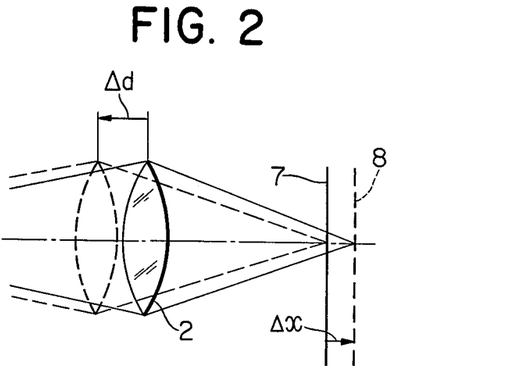
FIG. 2 is a schematic view of the optical path illustrating the relationship between the shift of the focusing lens and the shift of the object image.

Referring first to FIG. 1 there is shown a signle-lens reflex camera in which a focusing lens can be moved correspondingly to the deviation of image plane then detected.

Designated by 1 is an exchangeable lens structure unit including a taking lens 2. The light coming from an object and transmitted through the lens 2 passes through the light transmissive part of a quick-return mirror 4 provided with a sub-mirror 5 disposed directly behind the main mirror 4. The light is reflected by the sub-mirror toward a focus detection device 6 on the bottom part of the camera body. The focus detection device 6 detects the deviation $\pm \Delta X$ of the real focus plane 8 from a definite focal plane 7 of the lens 2, for example, from the film surface. The focus plane 8 is a plane on which an image of the object is really formed at the time. The sign $\pm$ of the deviation $\Delta X$ represents the relative position of the object focus plane 8 to the definite focal plane 7. In other words, the sign $\pm$ gives information of whether the focus plane 8 is in front of or behind the focal plane 7. The absolute value of the deviation $\Delta X$ represents the magnitude of the now existing deviation of focus.

Designated by 9 is a control circuit which generates a driving signal in response to the output $\Delta X$ from the focus detection device 6. A motor 10 in the exchangeable lens structure unit 1 is driven into forward rotation or reverse rotation or is brought into an instant stop by the driving signal issued from the control circuit 9. In accordance with the driving signal, the motor 10 moves the taking lens 2 toward its focus position through a transmission system 11.

12 is image plane shift signal generating means. Said signal generating means 12 makes up an image plane shift signal representing the amount of shift of the focus plane 8 resulting from the movement of the lens 2. The shift signal is made up based on the revolution number of the motor 10, the moved distance by the transmission system 11 and the distance moved over by the lens 2. The image plane shift signal is transmitted to the camera body from the lens unit 1 and is applied to the control circuit 9. When the image plane shift signal reaches a value corresponding to the value of the focus detection signal $\Delta X$, the control circuit 9 stops the motor 10 instantly. In this manner, the taking lens 2 is moved over a distance just enough to shift the image plane 8 through a distance corresponding to the deviation $\Delta X$ of the image plane detected by the focus detection device 6.

Figure 3:
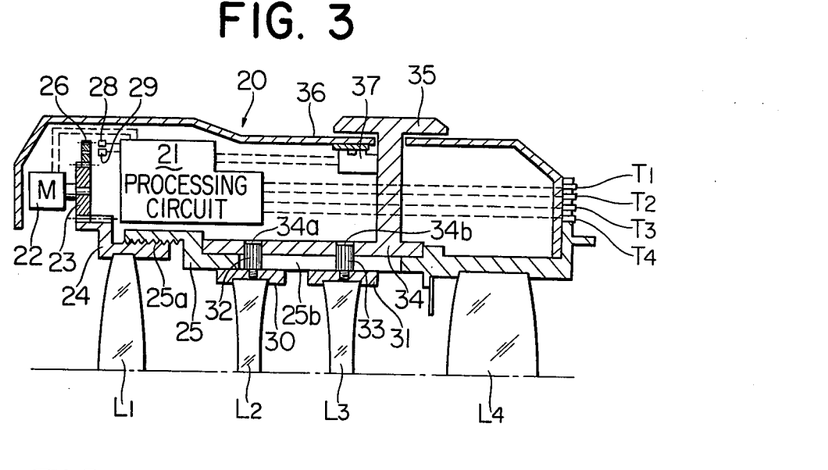
FIG. 3 is a sectional view showing an embodiment of the zoom lens structure according to the invention.

FIG. 3 shows an embodiment of the zoom lens barrel.

In FIG. 3, an exchangeable zoom lens structure unit is generally designated by 20. The zoom lens structure 20 comprises a focusing lens $L_1$, a variator lens $L_2$, a a compensator lens $L_3$ and a master lens $L_4$. On the rear end surface of the lens structure at which the lens unit is attached to the camera body there are provided signal terminals $T_1, T_2$ and $T_3$ and a ground terminal $T_4$. Through the signal terminals various signals are transmitted between the lens structure and the camera body.

Figure 4:
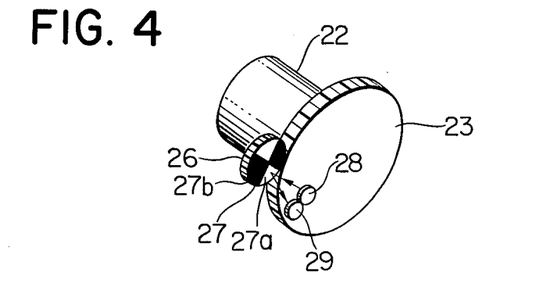
FIG. 4 is an enlarged perspective view of a part of the zoom lens structure shown in FIG. 3.

The motor driving signal issued from the control circuit 9 in the camera body is transmitted to a processing circuit 21 in the lens structure 20 through the terminals $T_1$ and $T_2$. The processing circuit 21 includes a motor driving circuit for driving a motor 22 and a modulation circuit of which a further detailed description will be made later. According to the motor driving signal from the camera body, the processing circuit 21 produces an output to drive the motor 21 in forward direction or reverse direction. The rotation of the motor 22 is transmitted through a gear 23 to a lens barrel 24 for holding the focusing lens $L_1$. The lens tube 24 is provided with a gear in mesh with the above gear 23 and a helicoid screw thread in engagement with the correspondingly formed helicoid thread 25a on the inner surface of a fixed tube 25 so that with the rotation of the motor 22 the focusing lens $L_1$ is moved forward or backward along the optical axis. In mesh with the gear 23 there is also a small gear 26 with a pattern 27 formed on the end surface thereof as shown in FIG. 4.

The pattern 27 is so formed as to detect the shift of the image plane. To this end, the circular end surface area of the small gear 26 is divided into four sections having equal area. That is, the pattern 27 is composed of two highly refractive sections 27a, 27a and two low refractive sections 27b, 27b as shown in FIG. 4. A light source 28 projects light on the pattern 27 at a definite point. The reflected light from the pattern is received by a photosensor element 29. Therefore, the photo sensor element 29 generates two pulses per one revolution of the gear 26 and therefore per one rotation of the pattern 27. These pulse signals are transmitted to the terminal $T_3$ through the processing circuit 21 as image plane shift signal. The pattern 27, light source 28 and photo sensor element 29 together constitute image plane shift signal generating means.

Generally speaking, the relationship between the shift $\Delta d$ of focusing lens and the shift $\Delta X$ of image plane varies depending on the optical characteristics of the taking lens such as the focal length thereof. Furthermore, the relationship between the revolution number of motor 22 and the amount of movement of focusing lens $L_1$ also varies depending on the chararacteristics of the transmission system therebetween. Accordingly, the relationship between the number of revolutions of the motor and the shift of focus plane is variable depending on the optical characteristics of the taking lens and the transmission system for different kinds of taking lenses. To meet it, this signal generation means has different patterns 27 for different kinds of taking lenses. The number of sections into which the pattern 27 is divided is changed according to the kind of the taking lens then mounted. By forming said signal generation means in this manner there is produced the same image plane shift signal for the same image plane shift $\Delta X$ independently of the kind of the taking lens. In other words, for the same shift $\Delta X$ there are generated always the same number of pulses irrespective of the kind of taking lens.

However, the above is not applicable to the case where the taking lens is a zoom lens. In the case of zoom lens, the relationship between the shift $\Delta d$ of the focusing lens and the shift $\Delta X$ of the image plane resulting from the movement of the lens can not primarily be determined but the relationship varies depending on the focal length then set of the zoom lens. More concretely, when the set focal length of the zoom lens is changed from $f_1$ to $f_2$ ($f_2 > f_1$), the shift of the focus plane increases in proportion to square of the ratio of the latter focal length to the former, namely proportionally to $(f_2/f_1)^2$. As readily understood from it, when the zoom lens is set to a long focal length, the shift of the image plane resulting from the same amount of movement of the focusing lens becomes remarkedly large as compared to the case where the zoom lens is set to a short focal length. On the other hand, above said image plane shift signal generating means generates the signal on the assumption that the focal length of the zoom remains fixed to a certain predetermined focal length. That is, said signal generating means generates the image plane shift signal based on a fictitious focal length. According to the shown embodiment, the maximum focal length of the zoom lens is selected for the fictitious focal length. The selection of the maximum focal length for the fictitious focal length brings about an advantage that at shorter focal lengths there are generated a larger number of pulse signals for the same shift of the image plane. In the case of zoom lens, therefore, the image plane shift signal has to be corrected correspondingly to the set focal length of the zoom lens. A really effective image plane shift signal can be obtained only after making such a correction. Although it is preferable to select the maximum focal length for the fictitious focal length, it is to be understood that any value within or out of the variable focal length range of the zoom lens also may be selected for the fictitious focal length. If a value out of the variable focal length range of the zoom lens is selected for the fictitious focal length, the output of said signal generating means can not directly represent the real image plane shift for any focal lengths within the zoom range. However, by correcting the output in the manner described above, an image plane shift signal indicative of the real shift can be obtained. Therefore, such an output is also referred to as image plane shift signal. For purpose of this specification the image plane shift signal is defined as a signal obtained by converting the amount of the movement of the focusing lens into a signal based on a determined relationship. In this embodiment, the correction is carried out by introducing information of focal length ratio into the processing circuit in the following manner:

Referring again to FIG. 3, the variator lens $L_2$ and the compensator lens $L_3$ are held in lens barrels 30 and 31 respectively which lens barrels in turn have stud pins 32 and 33 respectively. The stud pins 32 and 33 extend passing through a rectilinear guide slot 25b formed in the fixed tube 25 and then engages in cam slots 34a and 34b formed in a zoom tube 34. The zoom tube 34 is integrally formed with a zoom operation ring 35 which is manually rotated for zooming operation. A focal length ratio input device is composed of a variable resistor 36 and a slide brush 37. The slide brush 37 is slide-movable on the resistor 36 to change the resistance value thereof. The resistor 36 is connected to the processing circuit 21 whereas the brush 37 is fixed to the zoom operation ring 35. An angular position of rotation of the ring 35 determines a ratio of the set focal length to the maximum focal length, which ratio is introduced into the processing circuit 21 from the focal length ratio input device as a resistance value.

A portion of the circuit including the processing circuit 21 within the lens structure unit and the associated circuit within the camera body will hereinafter be described with reference to FIG. 5.

Figures 5, 6:
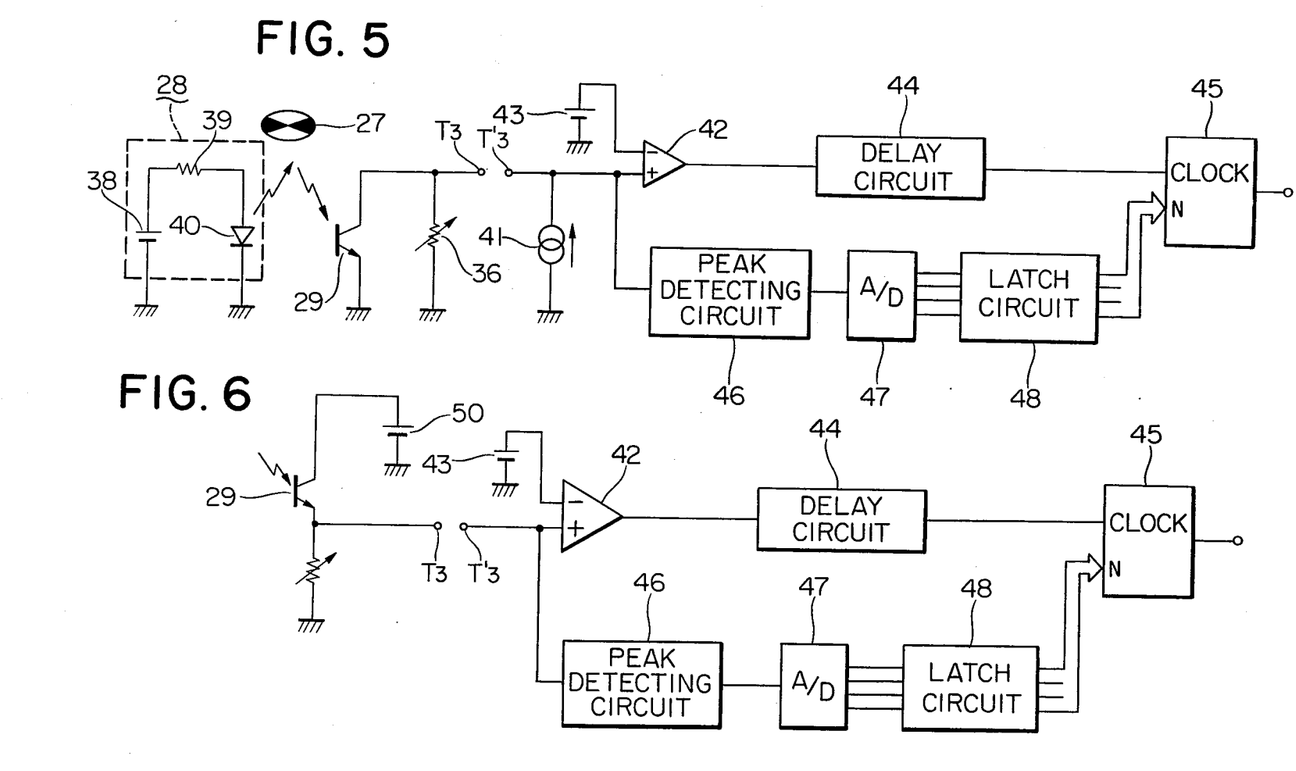
FIG. 5 is a circuit block diagram showing an embodiment of the invention.
FIG. 6 is a circuit block diagram showing a second embodiment of the invention.

In FIG. 5, the light source 28 is constituted of an electric power supply source 38, a resistor 39 and a light-emitting diode 40. The light emitted from the light-emitting diode 40 is reflected upon the pattern 27 and the reflect light enters the photo sensor element 29 which is, in the shown embodiment, a photo transistor. The emitter of the photo transistor 29 is grounded and the collector is connected to the terminal $T_3$. The variable resistor 36 of the focal length ratio input device is connected parallel to the photo transistor 29.

The arrangement of the circuit provided within the camera body is as follows:

A terminal $T'_3$ is connected to the terminal $T_3$ in the lens structure when the lens is mounted on the camera body. A constant current source 41 is connected between the terminal $T'_3$ and ground to supply a constant current to the terminal $T'_3$. 42 is a comparator which makes a comparison between the potential of the terminal $T'_3$ and the reference potential of a reference voltage source 43. The output of the comparator 42 is applied to the clock input terminal of a programmable counter 45 serving as a frequency divider through a delay circuit 44. The output of the counter 45 is applied to the controller 9 shown in FIG. 1. 46 is a peak detecting circuit for detecting the peak potential of the terminal $T'_3$. The analog output from the peak detector 46 is converted into a digital value by A/D converter 47 and the digital value is latched by a latch circuit 48. The output of the latch circuit 48 determines the number of increments of the programmable counter 45. That is, when the counter is regarded as a frequency divider, the frequency dividing ratio thereof is determined by the output of the latch circuit 48.

The manner of operation of the above embodiment is as follows:

The zoom lens structure 20 shown in FIG. 3 is mounted on the camera body 3 shown in FIG. 1 having the circuit shown in FIG. 5. The focus detector 6 in the camera body generates a focus detection signal in response to which the control circuit 9 generates a motor driving signal corresponding to the focus detection signal. The motor driving signal is transmitted to the processing circuit 21 in the lens structure through terminals $T_1$, $T_2$ shown in FIG. 3. Thereby the motor 22 starts rotating to move the focusing lens $L_1$ in the direction for focusing and also to rotate the pattern 27 on the gear 26.

On the other hand, the focal length set by the zoom operation ring 35 is introduced into the variable resistor 36 in terms of focal length ratio. With the rotation of the pattern 27, the light emitted from the light-emitting diode 40 shown in FIG. 5 is made incident intermittently upon the photo transistor 29 thereby rendering it conductive and non-conductive alternately. Since the constant current from the constant current source 41 flows into the circuit part including the parallel-connected photo transistor 29 and variable resistor 36, the potential at the terminal $T_3$ becomes ground level, that is, a low level potential when the photo transistor is rendered non-conductive and becomes a high level potential determined by the resistance value of the resistor 36, that is, by the focal length ratio when the photo transistor is rendered conductive. In this manner there are generated at $T_3$ pulse signals amplitude-modulated by the information of the focal length ratio. The pulse number of the pulse signal represents the shift of the image plane caused by the movement of the focusing lens for the maximum focal length. The amplitude of the pulse signal represents the focal length ratio. The reference potential of the reference voltage source 43 provided within the camera body is so selected as to be a value between the minimum pulse amplitude by the variable resistor 36 and the ground potential. Therefore, the comparator 42 converts the amplitude-modulated pulse signal into a shaped pulse signal having a certain constant amplitude while retaining the pulse number perfectly. The peak detecting circuit 46 detects the peak value of the amplitude-modulated pulse signal, that is, the focal length ratio. Thus, the comparator 42 separates and extracts only the pure image plane shift signal from the shift signal containing also the focal length ratio superimposed thereon. The peak detector 46 separates and extracts only the focal length ratio from the superimposed signal. The output of the peak detector 46, that is, information of the zoom ratio is converted into a digital signal by A/D converter 47. The digital signal is latched by the latch circuit 48 which then determines the number of increments, that is, the frequency dividing ratio of the programmable counter 45 according to the information of zoom ratio (focal length ratio). On the other hand, the shaped pulse signal of the comparator 42 representing the image plane shift signal is delayed by a delay circuit 44 until the increment number described above is determined for the counter 45. After the delay time, the shaped pulse signal is applied to the counter 45 which counts it. Thus, the counter 45 frequency-divides the pulse signal from the delay circuit 44 by the frequency dividing ratio determined based on the information of the focal length ratio. Therefore, the output pulse signal from the counter 45 represents, by its pulse number, the real shift of the image plane independently of the focal length of the zoom lens. This pulse signal is the image plane shift signal corrected to remove the effect of the focal length. Therefore, in this specification, this signal is referred to as corrected image plane shift signal. As soon as the corrected image plane shift signal from the counter 45 has got in coincidence with the image plane shift detected by the focus detector 6, the control circuit 9 shown in FIG. 1 issues a motor instant stop signal to stop the motor 22 instantly.

In the manner described above, the focusing lens $L_1$ is moved exactly a distance just corresponding to the output from the focus detector.

FIG. 6 shows a modification of the embodiment shown in FIG. 5.

In this modification, the photo transistor 29 and the variable resistor 36 are connected in series to each other. The terminal $T_3$ is connected to the connection point of the transistor 29 and the resistor 36. A power source 50 supplies power current to the serially connected 29 and 36. The constant current source 41 in the embodiment of FIG. 5 is unnecessary for the modified embodiment of FIG. 6. Other parts of the modified embodiment correspond to those of the embodiment of FIG. 5 and therefore need not be further described.

A concrete form of the motor driving circuit within the above-described processing circuit will be described with reference to FIG. 7.

Figure 7:
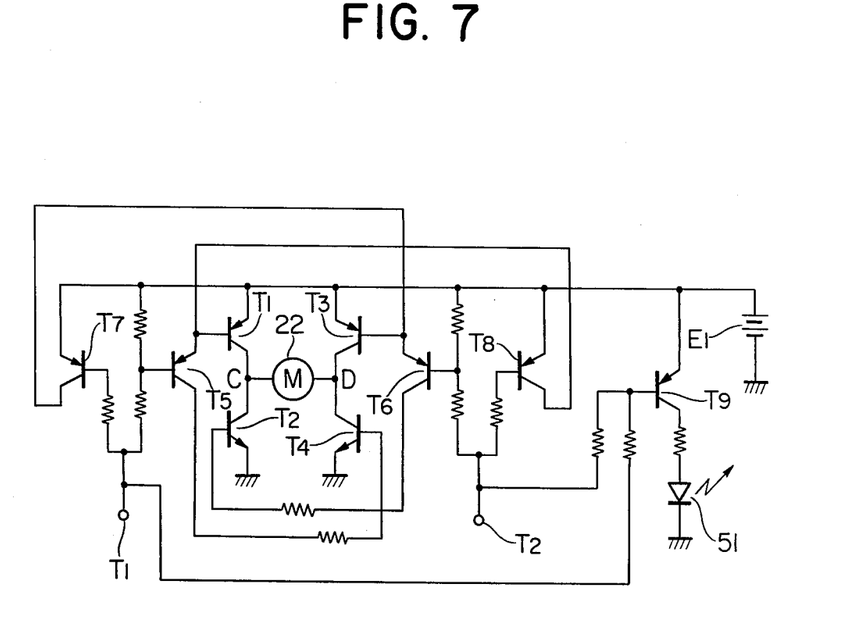
FIG. 7 is a circuit diagram showing the motor driving circuit.

The driving circuit shown in FIG. 7 drives the motor 22 in response to the motor driving signal coming from the camera body. The motor driving circuit includes transistors $T_1$ to $T_8$ and a power supply source $E_1$. 51 is a light-emitting diode serving as the light source 28 for projecting light on the above-described pattern. The power source $E_1$ supplies power current to the light-emitting diode 51 through transistor $T_9$. To drive the motor into forward rotation, low level signal and high level signal are applied to terminals $T_1$ and $T_2$ respectively. To drive the motor in the reverse direction, high level signal and low level signal are applied to $T_1$ and $T_2$, and to stop the motor instantly low level signal and low level signal are applied to $T_1$ and $T_2$ respectively. In the respective cases, the motor driving circuit operates in the following manner. Hereinafter, high level signal and low level signal are referred to simply as H signal and L signal.

(a) For forward driving:

Applied to the terminals $T_1$ and $T_2$ are L signal and H signal. Transistors $T_5$, $T_7$ and $T_9$ are rendered conductive by this L signal. With the conduction of the transistor $T_5$, transistors $T_1$ and $T_4$ are rendered also conductive. The remaining transistors remain all non-conductive. By the conduction of transistors $T_1$ and $T_4$ power is supplied to the motor 22 from the power source $E_1$. The motor 22 starts rotating in forward direction. At the time, by the conduction of transistor $T_9$, the light-emitting diode 51 is put on to project light upon the pattern 27.

(b) For backward driving:

Applied to terminals $T_1$ and $T_2$ are H signal and L signal. By this L signal transistors $T_6$, $T_8$ and $T_9$ are rendered conductive. With the conduction of the transistor $T_6$ transistors $T_3$ and $T_2$ are also rendered conductive. All the remaining transistors remain blocked. By the conduction of transistors $T_3$ and $T_2$ the flow of power current is reversed to that for forward rotation. Therefore, the motor 22 rotates in the reverse direction. Also, in this case, the light-emitting diode 51 is put on.

(c) For instant stop:

L signal is applied to both of terminals $T_1$ and $T_2$ for a predetermined time. Thereby transistors $T_5$ to $T_9$ are rendered conductive. Transistor $T_3$ is forcedly rendered non-conductive by the conduction of $T_7$ and also transistor $T_1$ is forcedly rendered non-conductive by the conduction of $T_8$. Consequently, only $T_2$ and $T_4$ become conductive with the conduction of $T_5$ and $T_6$. By the conduction of these two transistors $T_2$ and $T_4$ the motor 22 is short-circuited and brought to an instant stop. The light-emitting diode 51 lights on also at the instant stop of the motor 22. However, since L signal is applied to terminals $T_1$ and $T_2$ for only a short time required to stop the motor instantly. Therefore, after the short time the light of the diode 51 is put out.

(d) For stopping:

H signal is applied to both of terminals $T_1$ and $T_2$. All the transistors $T_1$ to $T_9$ are rendered non-conductive. Therefore, no power is supplied to the motor 22 and light-emitting diode 51. The motor stands stopping and the light-emitting diode is being Off.

As described above, the light-emitting diode 51 is energized to emit light only when the motor 22 is being driven forwardly or backwardly to move the focusing lens $L_1$. This has the effect of saving power.

In the embodiment shown in FIG. 5, the light-emitting diode 40 continues to emit light during the time the peak detector 46 is detecting the information of focal length ratio. Therefore, there is the possibility that even when the light from the light-emitting diode 40 is incident on the low reflective section 27b of the pattern 27, the light may enter the photo transistor 29 via any unexpected path. In such a case, it is possible that the photo transistor 29 can not completely be blocked. This will hinder the accurate detection of the information of focal length ratio. According to another embodiment of the invention, this problem can be eliminated completely. The embodiment will be described hereinafter with reference to FIG. 8.

Figure 8:
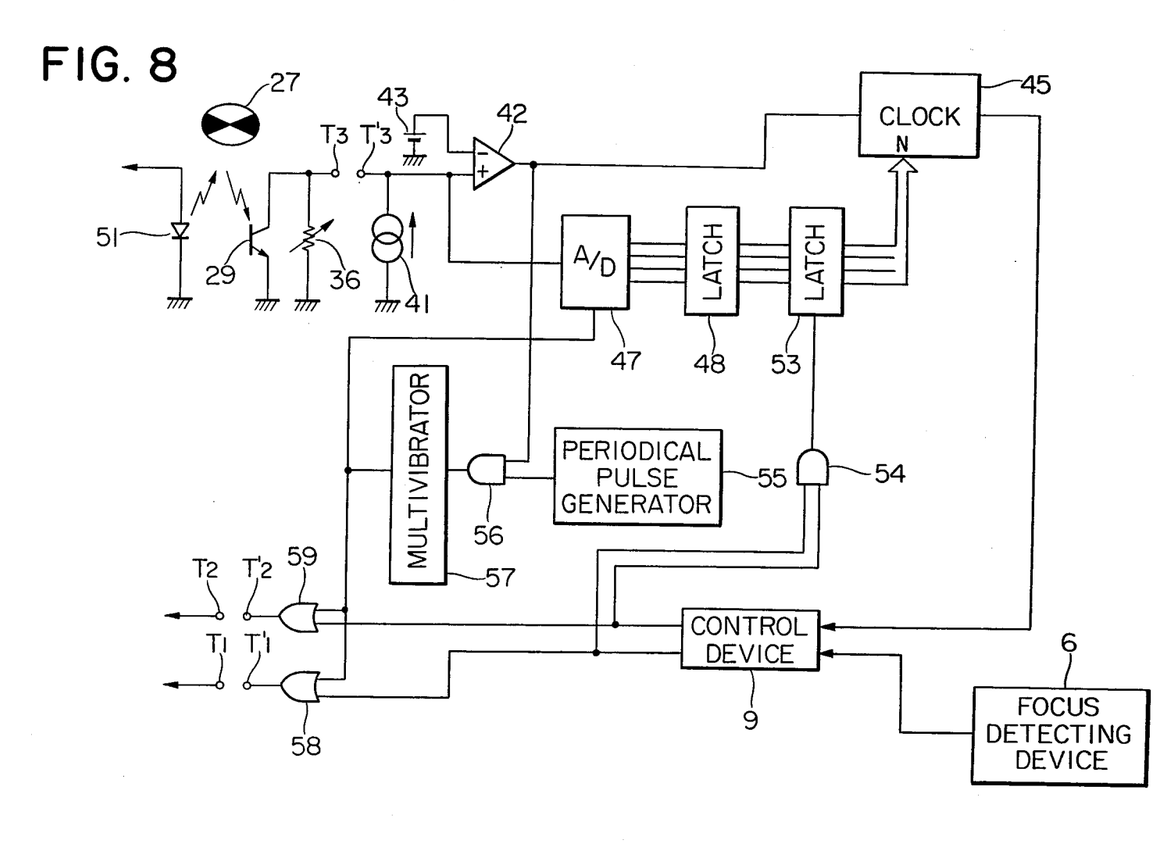
FIG. 8 is a circuit block diagram showing a third embodiment of the invention.

In FIG. 8, the light-emitting diode 51 substantially corresponds to that in the embodiment of FIG. 7. The light-emitting diode remains deenergized during the time of no power being supplied to the motor 22. Also, photo transistor 29, variable resistor 36, constant current source 41, comparator 42, reference voltage source 43, programmable counter 45, A/D converter 47 and latch circuit 53 shown in FIG. 8 correspond to those previously shown in FIG. 5.

The embodiment shown in FIG. 8 includes a second latch circuit 53. The second latch circuit 53 reads and latches the output of the first latch circuit 48 only when a high level output is applied to it from AND gate 54. The input terminals of AND gate 54 are connected to the output terminals of the control circuit 9 respectively.

55 is a periodical pulse generator for generating a trigger pulse. The trigger pulse has a period sufficiently larger, for example, 5 to 50 times larger than the period of the output pulse signal of the comparator 42. The pulse width of the trigger pulse is equal to or a little shorter than the period of the output pulse signal from the comparator 42. The output terminals of the pulse generator and comparator 42 are connected to the input terminals of AND gate 56 the output terminal of which is connected to the input terminal of a multivibrator 57. In response to the rising of high level output of AND gate 56, the multivibrator 57 sends out a high level pulse to the input terminals of A/D converter 47 and OR gates 58 and 59 for a certain determined time. The input terminal through which the high level output pulse is applied to A/D converter 47 is A/D conversion start signal input terminal. The pulse width of the output pulse from the multivibrator 57 is smaller than the width of the pulse signal from the comparator 42. The control circuit 9 receives the outputs from the focus detector 6 and from the counter 45 and produces out the motor driving signal to the processing circuit 21 in the zoom lens structure 20 through OR gates 58, 59 and terminals $T_1$, $T'_1$, $T_2$, $T'_2$.

The manner of operation of the embodiment is as follows:

The control circuit 9 receives a detection signal from the focus detecting circuit 6 and generates a motor driving signal corresponding to the received detection output. According to the motor driving signal, the motor 22 within the zoom lens structure is driven forward or backward to move the focusing lens in the direction for focusing. At the same time the light-emitting diode 51 is put on.

With the rotation of the motor 22 the patter 27 also rotates and the comparator 42 continuously generates pulse signals. During the generation of this pulse signal, the periodical pulse generator 55 generates a trigger pulse. Since, as previously noted, the pulse width of the trigger pulse is nearly equal to the period of the pulse from the comparator 42, the output level of AND gate necessarily becomes high during the generation of the trigger pulse.

In response to the rising of above high level output, the multivibrator 57 generates a pulse for a short time. By this pulse the potentials at terminals $T_1$ and $T_2$ are both rendered high for a short time through OR gates 58 and 59. Therefore, the light-emitting diode 51 is deenergized. Naturally the power supply to the motor 22 is cut off for a short time by the above high level potential. However, the motor continues to rotate owing to inertia. The output pulse from the multivibrator 57 is applied also to the A/D conversion start signal input terminal of A/D converter 47. The potential of terminal $T_3$ at the light-out of the light-emitting diode 51, that is, the resistance value of the variable resistor 36 is converted into a digital value which is latched by the latch circuit 48. When a determined relationship is established between the corrected image plane shift signal from the counter 45 and the output from the focus detector 6, the control circuit generates a signal for stopping the motor instantly for a short time, and renders the potential level of both of terminals $T_1$ and $T_2$ low to stop the motor at once. After stopping the motor 22 instantly, the control circuit 9 applies a high level signal to both of terminals $T_1$ and $T_2$ to cut off the power supply to the motor 22. The high level outputs at both the terminals $T_1$ and $T_2$ allow AND gate to transmit the latch signal to the second latch circuit 53. In response to the latch signal, the second latch circuit 53 reads and latches the output from the first latch circuit 48. The output from the second latch circuit 53 determines the increment number of the counter 45 and makes it prepared for correcting the image plane shift signal resulting from the movement of the lens according to the focus detection signal generated after that.

In this manner, on the completion of the lens movement corresponding to the focus detection signal, the second latch circuit 53 reads the output of the first latch circuit and introduces the information of focal length ratio to the counter 45 as a correction value. Based on the correction value, the counter 45 corrects the image plane shift signal resulting from the focus detection signal generated after that.

As described above, according to the embodiment shown in FIG. 8, the light-emitting diode 51 is forcibly put off during the time of the focal length ratio information being read in. Therefore, this arrangement completely prevents the accuracy of detection from being adversely affected by stray light or the like.

In the above embodiment the second latch circuit 53 has read and latched the focal length information output from the first latch circuit 48 at the fall-down of the high level output of AND gate 54, that is to say, immediately after the focusing lens has been moved over a distance corresponding to a focus detection signal generated at a certain time point. This means that if the focal length of the zoom lens is changed by the photographer after the completion of this movement, the second latch circuit 53 can not read the information of the new focal length given by the focal length change. In such a case there is produced the problem that the next focusing operation is performed based on wrong information of focal length. However, this problem may be solved in a simple manner by connecting an inverter to the output terminal of AND gate 54. In the arrangement modified by the connection of an inverter in this manner, the second latch circuit 53 reads the output from the first latch circuit 48 when the output of AND gate 54 is inverted from high level to low level. The time point at which the output of AND gate 54 is inverted from high level to low level is the time point at which one of the two outputs of the control circuit 9 is turned to low level to drive the motor in accordance with the next focus detection signal. Therefore, the second latch circuit 53 can read the information of the new focal length at the start of the next focusing operation.

While the invention has been particularly shown and described with reference to preferred embodiments thereof it is to be understood that various changes and modifications may be made therein without departing from the scope of the invention.

For example, it is not always necessary for the information of focal length to be in the form of focal length ratio as shown in the above embodiments. Since the information is used to correct the change of the relationship between the shift of focusing lens and the shift of focus plane caused by the change of focal length, the set focal length per se may be introduced as the necessary correction information. Focal length ratio is a mere example of various processed forms of the focal length. Therefore, the correction information may be in other processed form than focal length ratio. Furthermore, the purpose for which above correction is made may be attained by correcting the focus deviation detection signal of the focus detector 6 by use of the focal length information.

In the above embodiments, the focal length information has been transmitted to the camera body from the lens structure by means of electric signal. However, the transmission of the focal length information may be carried out by means of other signals such as mechanical signal, for example a signal pin provided on the lens structure, magnetic signal and optical signal.

It is also to be understood that the variable focal length lens structure used in the invention is never limited to those lenses whose focal length is variable continuously as in the case of zoom lens, but it includes those lenses which are variable in focal length separately.

Also, while the image plane shift signal has been modulated by focal length information such as focal length ratio to superimpose the focal length information on the image plane shift signal, it is obvious that in the light of the above teachings other various information such as information of the value set by the distance setting ring of the taking lens, information of the set aperture value, information of the maximum or minimum aperture value may be superimposed instead of information of focal length. By making superimposed signals according to the conception of the invention, it is possible to transmit a larger number of signals between the camera body and the taking lens unit mounted thereon without increasing the number of terminals.

We claim:

1. An automatic focusing device for a camera employing a variable focal length photographing lens system and said device comprising:

focus detection means for measuring the light transmitted through said photographing lens, detecting the existing deviation of the real image plane on which an image of an object is now being really formed, relative to a predetermined focus plane, and generating a signal representing the detected deviation;

driving means for moving said photographing lens for focusing operation;

means for converting the amount of movement of said photographing lens driven for focusing operation into a shift signal related to the shift of said real image plane resulting from the movement of said driven photographing lens based on a predetermined relationship independent of the change of focal length;

means for generating a focal length signal related to the set focal length of said photographing lens; and means for controlling the amount of the movement by said driving means based on said shift signal, said focal length signal and said deviation signal.

2. An automatic focusing device according to claim 1, wherein said control means includes correction means for generating a corrected shift signal corresponding to the first mentioned shift signal corrected by said focal length signal; and means for controlling the amount of said movement by said driving means based on said corrected shift signal and said deviation signal.

3. An automatic focusing device according to claim 1, wherein said converting means converts the amount of said movement by said driving means into said shift signal in such a manner that when said photographing lens is set to its maximum focal length, said shift signal represents the shift of said real image plane.

4. A variable focal length and automatic focusing photographing lens having a focusing lens and a focal length changing lens, said photographing lens comprising:

means for driving said focusing lens;

means for converting the amount of movement of said driven focusing lens into a shift signal related to the amount of shift of the real image plane resulting from the movement of said driven focusing lens based on a predetermined relationship independent of the change of focal length;

said converting means including means for producing an alternating signal having a period depending on the moving speed of said focusing lens, said alternating signal being said shift signal, means for generating a focal length signal related to the set focal length; and terminal means for producing said shift signal and said focal length signal at the exterior of said photographing lens.

5. A photographing lens according to claim 4, wherein said driving means has an electric motor for moving said focusing lens, and said alternating signal producing means is driven by said electric motor.

6. A photographing lens for a camera, being provided with a focusing lens, said photographing lens comprising:

means for driving said focusing lens;

means for generating an alternate current signal related to the amount of movement of said driven focusing lens;

means for generating information of said photographing lens other than the information of said amount of movement;

means for modulating said alternate current signal according to said information; and terminal means provided to put out said modulated alternate current signal toward said camera.

7. A photographing lens according to claim 6, wherein said alternate current signal generating means includes means producing a corresponding number of pulse signals to the amount of shift of the focal plane of said photographing lens resulting from the movement of said focusing lens.

8. A photographing lens according to claim 7, wherein said modulation means includes means for amplitude-modulating said pulse signal in accordance with said information.

* * * * *

UNITED STATES PATENT AND TRADEMARK OFFICE
CERTIFICATE OF CORRECTION

PATENT NO. : 4,482,235

DATED : November 13, 1984

INVENTOR(S) : SEIICHI YASUKAWA, ET AL.

It is certified that error appears in the above-identified patent and that said Letters Patent is hereby corrected as shown below:

Claim 1, line 3 (Column 11, line 14), delete "and";
line 5, change "," to --and--.

Signed and Sealed this

Twenty-sixth Day of March 1985

[SEAL]

Attest:

DONALD J. QUIGG

Attesting Officer     Acting Commissioner of Patents and Trademarks